United States Patent [19]
Wheatley et al.

[11] Patent Number: 5,149,578
[45] Date of Patent: * Sep. 22, 1992

[54] MULTILAYER FILM FOR TAMPER INDICATION BY USE OF OPTICAL INTERFERENCE REFLECTION

[75] Inventors: John A. Wheatley; Walter J. Schrenk, both of Midland, Mich.

[73] Assignee: The Dow Chemical Company, Midland, Mich.

[*] Notice: The portion of the term of this patent subsequent to Mar. 10, 2009 has been disclaimed.

[21] Appl. No.: 814,237

[22] Filed: Dec. 23, 1991

Related U.S. Application Data

[63] Continuation of Ser. No. 456,922, Dec. 26, 1989, abandoned.

[51] Int. Cl.$^5$ .................. B65D 101/00; G02B 1/10; B32B 7/00
[52] U.S. Cl. .................. 428/213; 359/359; 359/556; 359/554; 359/587; 359/588; 215/246; 53/442; 206/807; 428/131; 428/156; 428/212; 428/215; 428/423.1; 428/480; 428/913
[58] Field of Search .............. 359/359, 586, 584, 587, 359/588; 215/246; 53/442; 206/807; 428/131, 156, 212, 213, 215, 423.1, 480, 913, 916, 918, 515, 516

[56] References Cited

U.S. PATENT DOCUMENTS

| | | | |
|---|---|---|---|
| 3,247,392 | 4/1966 | Thelen | 350/1.6 X |
| 3,565,985 | 2/1971 | Schrenk et al. | 264/171 |
| 3,759,647 | 9/1973 | Schrenk et al. | 425/131 |
| 3,773,882 | 11/1973 | Schrenk | 264/171 |
| 3,884,606 | 5/1975 | Schrenk | 264/171 X |
| 3,887,742 | 6/1975 | Reinnagel | 428/916 X |
| 4,018,640 | 4/1977 | Amberg | 428/916 X |
| 4,094,947 | 6/1978 | Alfrey, Jr. et al. | 264/171 |
| 4,310,584 | 1/1982 | Cooper et al. | 428/212 |
| 4,417,784 | 11/1983 | Knop et al. | 350/162.19 |
| 4,469,725 | 9/1984 | Fischer et al. | 428/13 |
| 4,516,679 | 5/1985 | Simpson et al. | 206/454 |
| 4,717,615 | 1/1988 | Reinhart | 428/161 |
| 4,721,217 | 1/1988 | Phillips et al. | 215/230 |
| 4,733,786 | 3/1988 | Emslander | 215/230 |
| 4,837,061 | 6/1989 | Smits et al. | 428/40 |
| 4,876,311 | 10/1989 | Hennig et al. | 525/229 |
| 4,890,763 | 1/1990 | Curiel | 428/916 X |
| 4,937,134 | 6/1990 | Schrenk et al. | 428/213 |
| 4,986,063 | 11/1990 | McConville et al. | 350/105 X |

OTHER PUBLICATIONS

Article "Multilayer Filters with Wide Transmittance Bands" vol. 53, No. 11, Jrnl of Optical Soc. of America.
Article "Reflectivity of Iridescent Coextruded Multilayered Plastic Films" vol. 13, No. 3, Polymer Engineering and Science Article, Tamper Evident Packaging and Food, ASTM Standardization News.
Compilation, "Tamper Evident Packaging—A Literature Review" PIRA Information Services publishing, pp. A85-88.

*Primary Examiner*—Ellis P. Robinson
*Assistant Examiner*—William P. Watkins, III

[57] ABSTRACT

A multilayer film including contiguous layers of two or more diverse thermoplastic materials of differing refractive indices whereby the film retains a permanent color change as evidence of tampering or an attempt at tampering when the yield point of at least one of the diverse materials has been at least equalled by the strain associated with such tampering or with such an attempt at tampering, and where before such yield point is at least equalled the wavelength of an unsuppressed reflectance of normally incident light is not within the visible spectrum while after such yielded point is at least equalled the reflectance is retained in the visible spectrum.

17 Claims, 3 Drawing Sheets

MULTILAYER FILM FOR TAMPER INDICATION BY USE OF OPTICAL INTERFERENCE REFLECTION

CROSS-REFERENCE TO RELATED APPLICATION

This is a continuation of application Ser. No. 07/456,922 filed Dec. 26, 1989, abandoned.

BACKGROUND OF THE INVENTION

1. Field of the Invention

This invention relates to indicators, and more particularly to multilayer film indicators which provide visible evidence of strain. In one aspect, the invention relates to the use of such multilayer film indicators to provide both visible evidence of tampering and a resistance to tampering with respect to articles or items packaged therein, whereby the indicators find use within or as a tamper evident, tamper resistant packaging material. In another aspect, the invention relates to an item such as a container which has been at least partially packaged within such a packaging material, and to a method of protecting the contents of the container from adulteration or otherwise ensuring the integrity or authenticity of the contents by wrapping the container in its entirety or in significant part with the tamper evident, tamper resistant packaging material.

BRIEF DESCRIPTION OF THE PRIOR ART

It has been recognized that coextruded multilayer films having a mismatch in refractive indices between adjacent polymer layers can be made to selectively reflect near infrared, visible or ultraviolet wavelengths of light. It has also been suggested that when designing a film to reflect in the infrared, it may be possible to suppress higher order reflections which might enter into the visible range, see, e.g., "Reflectivity of Iridescent Coextruded Multilayered Plastic Films," Radford, Alfrey, Jr., and Schrenk, Polymer Engineering and Science, vol. 13, 3 (May 1973); U.S. Pat. No. 3,247,392 to Thelen; and "Multilayer Filters with Wide Transmittance Bands," Thelen, Journal of the Optical Society of America, vol. 53, 11 (1963). It has been further recognized that altering the overall thickness of such a multilayer film will alter the apparent color or selective reflectivity of such films, see U.S. Pat. No. 4,094,947 to Alfrey, Jr. et al.

The extension of these ideas to create a multilayer optical interference film indicator which in an initial condition is substantially colorless but which when strained to a selected extent will produce visible evidence of such strain, comprising contiguous layers of at two diverse thermoplastic materials of differing refractive indices, and wherein the yield point of at least one of the materials has been at least equalled when the visible evidence is produced, has not been suggested. Specifically, such a multilayer optical interference film indicator has not been previously known or suggested which is further heat shrinkable and useful as a tamper evident, tamper resistant packaging material, whereby an attempt to tamper with the packaged item will provide dramatic visual evidence to potential purchasers of that item of such an attempt and whereby the film will rupture with further strain while such evidence is still visible.

Considering the art as it specifically relates to such multilayer tamper evident, tamper resistant film packaging materials, recent survey data show that several of the more common measures taken by producers of over the counter drugs and now, increasingly of grocery items as well, are not satisfactory in terms of providing evidence of tampering. These data are reproduced below in Table I, and show on the average that as much as 44 percent of the consumers surveyed could not detect tampering in packages using these measures. Further, in the same survey it is reported that as many as 25 percent of the persons surveyed thought that the untampered packages had been subject to tampering.

TABLE I

| Package Form | % Who Did Not Detect Tampering | |
|---|---|---|
| | Average | Range |
| Blister | 44% | 9–76% |
| Metal Breakaway Cap | 12% | 5–22% |
| Metal Can | 40% | 19–61% |
| Membrane Seal | 40% | 26–64% |
| Heat Shrink Band | 28% | 24–31% |

Source: Lockhart, "Tamper Evident Packaging and Food," ASTM Standardization News, March 1988;

Several packaging systems which purport to be tamper evident, tamper resistant, or both tamper evident and tamper resistant have been the subject of U.S. patents. For example U.S. Pat. No. 4,516,679 to Simpson et al. discloses a multilayer wrap consisting of a number of over-laid thin plastic sheets bonded around the outer edge to contain a number of chemical layers therein, appropriately separated, whose penetration or puncture would result in a reaction generating a gas blister, heat, a color change, a rapid deterioration or weeping at the point of puncture. An outer sheet having stamps or seals spaced thereon to suggest product origin is also suggested.

Such a wrap poses several obvious potential difficulties, however. One such difficulty is the likelihood that tampered packages will weep chemicals onto adjacent, untampered packages, exacerbating the manufacturers' existing problem with consumers rejecting untampered products as having been tampered with, as reported in the survey. Another potential difficulty lies in the accidental exposure of either the package contents or the consumer to chemicals on application or removal of the protective wrap. A need to limit the quantity of chemicals used to protect excessive fumes, smoke or fires is observed in the patent itself, as is the possibility that counterfeiting of the wrap without the chemicals being present might be possible unless the seals or stamps on the external film layer are of a certain degree of complexity. Moreover, from the viewpoint of a manufacturer of articles to be wrapped in this material the use of seals or stamps may detract from the trade dress of the product to be wrapped therein as a whole.

Another packaging system which is said to provide visual evidence of tampering is described in U.S. Pat. No. 4,721,217 to Phillips et al. An optically variable device is disclosed which comprises a first layer attached to a first part of the package or of a consumer article, a second layer attached to a second part of the package or article which is movable with respect to the first part, and a release layer disposed between the first and second layers of the device to permit the first and second layers to be separated. When intact, the first and second layers provide a reflection of visible color which changes according to the viewing angle. When the first and second parts are moved with respect to one another and the first and second layers separated, this optical shifting property is said to be destroyed, and cannot be restored by reassembly except as a different color shift or as a color resembling an oil slick.

This system appears to be deficient in several ways as well. One such deficiency might be the requirement that consumers be able to detect the presence of a different color shift than intended by the manufacturer, or even the presence of a color shift at all. This difficulty is perhaps illustrated by an example of an optically variable device which is provided in the referenced patent. This device reflected a green color at normal incidence and a blue color at a 45° angle, and when tampered with a grayish color in transition and a tinge of blue at an angle. Depending on the consumer, this gray to blue transition may appear to satisfy a specified green to blue transition. Moreover, that portion of the population which has blue-green color blindness may be unable to detect any color shift, as would be true of any person who insufficiently altered his or her viewing angle with respect to the device. There is no suggestion of using the device as a multilayer film for example, in the form of an overwrap, a membrane across a container opening, or as a heat-shrinkable band around a screw-type or other cap.

Additional packaging systems and materials are reported in "Tamper Evident Packaging—A Literature Review", compiled and written by Prof. Frank A. Paine for Pira Information Services (1988). Indicators in particular which are said to provide visual evidence of tampering are reported at pages A85-88 therein, but these indicators possess some of the same disadvantages as described above.

In view of the alarming number of incidents of product tampering in recent years, not to mention the existence of federal regulations mandating the use of tamper evident and tamper resistant packaging with certain products, and further in view of the apparent shortcomings of known packaging systems as described above, there is a compelling need for a packaging material which is both tamper evident and tamper resistant but which does not rely to a significant extent on the perceptiveness of consumers, which does not pose a safety risk, and which is relatively easy to manufacture, apply and use.

SUMMARY OF THE INVENTION

The present invention fulfills this need by providing, as indicated above, a multilayer optical interference film indicator which in an initial condition is substantially colorless but which when strained to a selected extent will produce visible evidence of such strain, comprising layers contiguous of two or more diverse thermoplastic materials of differing refractive indices, wherein the yield point of at least one of the diverse materials has been at least equalled when the visible evidence of strain is produced.

The multilayer optical interference film indicator of the present invention, whose operation and construction will be explained subsequently in detail, is thought to have particular utility as a tamper evident, tamper resistant packaging material although other uses are contemplated for an indicator having the qualities described above, as for example indicating the presence or absence of gas or fluid pressure adjacent the indicator, or the volume changes of an article or material accompanying a freeze-thaw cycle.

In another aspect, the present invention relates to an item which has been at least partially packaged within an indicator of the present invention, as for example where the indicator has been joined to two portions of the item which are movable with respect to one another.

A method of protecting the contents of a container from adulteration or otherwise ensuring the integrity or authenticity of the contents is also disclosed, and includes the step of wrapping the container in its entirety or in significant part with a tamper evident, tamper resistant packaging material which includes an indicator of the present invention.

Other features, advantages and uses of the multilayer film indicator of the present invention will become apparent on considering the description which follows in conjunction with the appended claims and accompanying drawings.

DETAILED DESCRIPTION OF THE PREFERRED EMBODIMENT

In the way of background, for multilayer optical interference films having a period of P layers, it has been previously determined that the primary reflectance of normally incident light occurs at a wavelength $\lambda_0$, wherein $$\lambda_0 = 2 \sum_{i=1}^{P} (n_i d_i),$$

and $(n_i d_i)$ is the product of the refractive index n and physical thickness d associated with a given layer. This quantity will hereafter be referred to as the "optical thickness" of that layer.

Higher orders of reflectance occur at wavelengths determined by the equation $\lambda_M = \lambda_0/M$, where M is the order of reflectance. For example, if the primary reflectance $\lambda_0$ is at 1400 nanometers, then subsequent orders of reflectance will occur at about 700 nanometers (second order), 467 nanometers (third order), 350 nanometers (fourth order), and so on.

As noted earlier, it has been suggested previously that higher order reflections could be suppressed by a proper selection of optical thicknesses within a multilayer structure. For structures having certain periodicities, it has been suggested that a second order reflection, for example, could be suppressed or a second and a third order reflection, or even second, third, and fourth order reflections. This last suggestion was accompanied by a prescription for achieving such a suppression. The periodicity of layers of materials A, B, and C within the structure according to this prescription would be ABC- CBA with the "CC" representing two thicknesses of the C material, the optical thickness of the A layers would be $n_A d_A = \lambda_0/12$, and the refractive indices of the A,B, and C materials would be related by $n_B = \sqrt{n_A n_C}$, "Multilayer Filter with Wide Transmittance Bands", Thelen, Journal of the Optical Society of America, vol. 53, 11, pages 1266–1270 (1963).

Going beyond the above concepts it has now been discovered that a multilayer optical interference film indicator can be constructed which in an initial condition is substantially colorless, but which when strained to a selected extent will produce and retain visible evidence of such strain without the drawbacks associated with the prior art as documented earlier.

Figure 1:
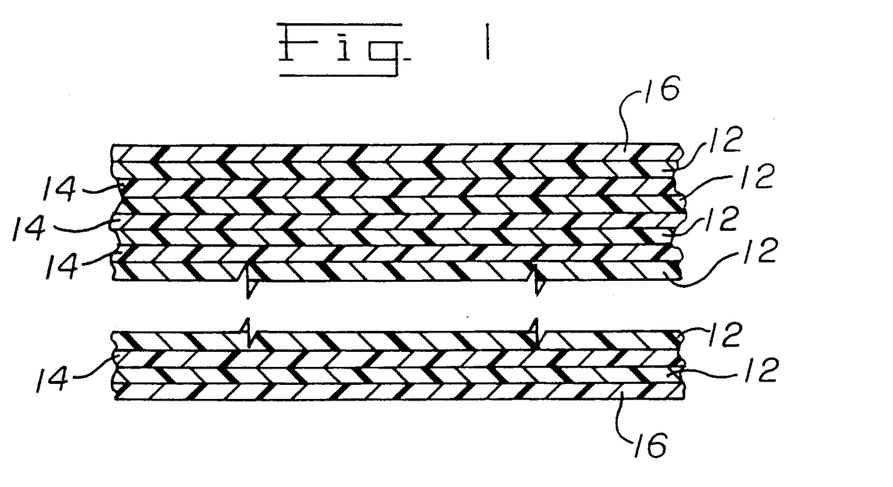
FIG. 1 is a cross-sectional view of a preferred embodiment of the multilayer film indicator of the present invention.

Referring now to the drawings, and more particularly to FIG. 1, a preferred multilayer film indicator 10 of the present invention is illustrated. The indicator 10 shown in FIG. 1 consists essentially of layers 12 and 14 of two diverse thermoplastic materials A and B in an ABAB-type layer order, wherein the layers 12 correspond to layers of a material A and the layers 14 to an optically diverse material B.

It should be noted that the "diverse thermoplastic materials" need not differ in any respect except in terms of refractive index. Thus, while the materials of the layers within an indicator may be chemically diverse, if these materials have the same refractive index then they are not "diverse" for purposes of the present invention. Similarly, the materials may be virtually identical in every other respect save refractive index, yet they are to be considered diverse for purposes of this disclosure.

The optically inactive outer skin layers 16 shown are primarily included and are sufficiently thick to prevent excessive break up of the thin layers 12 and 14 of A and B in processing and making the indicator 10 by the preferred multilayer coextrusion processes, there being generally in the indicators of the present invention preferably at least about fifty layers of the various diverse materials comprising the laminate. The outer skin layers may also be present in a particular thickness for contributing to the structural properties of the indicator, however.

The multilayer coextrusion processes which are preferred for making the indicator 10 are taught, for example, in the commonly assigned U.S. Pat. Nos. 3,565,985 and 3,773,882, the disclosures of which are hereby incorporated herein by reference.

The films of the present invention are designed such that in an initial condition the primary reflectance $\lambda_0$ of the preferred two-component film shown in FIG. 1, for example, is substantially in the near infrared: $\lambda_0 = 2(n_A d_A + n_B d_B) \approx 0.7$ μm or greater, where $n_A$ and $n_B$ represent the respective refractive indices of the materials A and B, and $d_A$ and $d_B$ the respective average physical thicknesses of layers 12 and 14 of A and B, respectively, within a period AB of the indicator 10.

To be most effective as a tamper evident and tamper resistant film, or indeed as a strong visual indicator of strain, the visual contrast between an initial condition and a condition corresponding to the presence of a degree of strain in excess of that which might be attributable to other causes such as accidental mishandling and so forth must be sufficiently great as to be easily and unequivocally perceived.

This contrast comprises the visual evidence of tampering which is basic to the present invention, and is preferably created by achieving as nearly as possible a complete absence of color in the multilayer optical interference film indicators of the present invention in an initial condition, to be contrasted with vivid colors as a sign of strain against the backdrop of an indicator's environment or against a skin layer 16 which is tinted black, for example, as will be subsequently explained.

It has now been found that, in the two component multilayer film shown in FIG. 1 and having an AB-type periodicity, where a substantial majority of the layers 12 and 14 possess an optical thickness of about 0.17 micrometers or greater in the initial condition and further where the ratio $$f_A = \frac{n_A d_A}{(n_A d_A + n_B d_B)}$$

is equal to about 0.5, an acceptable absence of color results for multilayer films having the layer thickness gradients in the film thickness direction and thus the reflectance band widths which are possible using the processing techniques described in U.S. Pat. Nos. 3,565,985 and 3,773,882 and exemplified below.

It should be observed that ordinarily it will be desirable to have some gradient in layer thickness in the film thickness direction and thus a fairly broad bandwidth for the primary reflectance of an indicator, as an indicator possessing such a bandwidth will give a more vivid indication of strain than a film indicator having a narrow primary reflectance bandwidth. Preferably, then, as respects the bandwidth of the primary reflectance peak the reflectance spectrum will have more of the character of FIGS. 2 and 3 than that shown in computer-generated FIGS. 4 and 5.

Obviously, the extent of accidental strain for which allowance must be made to avoid an unacceptable number of false-positive answers may vary according to the environment and use of the indicator, and given a primary reflectance of a particular magnitude and bandwidth, other accommodations may need to be made in the optical thicknesses of the various layers, in the layer thickness gradients produced in the thickness direction of an indicator by a given manufacturing process, and/or in the number of layers in the indicators to preserve an acceptable lack of color in these other circumstances. These accommodations and the selection of which adjustments to make are well within the design skills of a person of ordinary skill, given the present disclosure.

While some degree of nonuniformity is thus desirable in the layer thickness direction, layer thickness nonuniformities throughout the length and width of the indicator in contrast are preferably small enough so that the indicator 10 is not colorless at one location and already showing visible color at another location. What nonuniformities are "small enough" for a given application again depends on the context and environment in which the indicator is used, but a particular example of the limits implied by this term may be found in the examples which follow. The uniform presence of color or the lack thereof throughout the extent of the indicator is important, of course, although not strictly necessary if the signal color change is to provide the basically unequivocal evidence of strain that is desired.

Essentially the amount of strain which is induced in routine handling or which is otherwise accidentally induced is of concern because as the film is stretched either locally or on a larger scale, the actual physical thicknesses $d_A$ and $d_B$ of film layers A and B are reduced. In turn, as the thicknesses $d_A$ and $d_B$ grow smaller, so do the corresponding optical thicknesses and the sum of the optical thicknesses, and thus so too the wavelengths corresponding to the primary and higher order reflectances of the film.

At a selected extent of strain, the optical thicknesses of a sufficient number of layers are reduced in the indicator so that visible evidence of the strain is produced in the form of various colors. This selected extent of strain will preferably be only slightly in excess of that which might be accidentally produced, so as to give prompt visual evidence of even the most abortive attempts at tampering without the rejection of an undue percentage of unadulterated products that has been previously experienced.

Where this visual evidence will be produced in the indicator will depend on the construction of the indicator, and on how the indicator is connected to an item as a tamper evident packaging material, for example whether the ends or edges of the indicator are attached to the item. In terms of the construction of the indicator, it may be desirable in some applications to reduce the cross-sectional area of a film indicator at regular intervals while not altering the thickness of the indicator, as by locally narrowing the width of the indicator or by perforating the indicator. These locally narrowed portions of the indicator can then be preferentially strained so that characteristic intermittent bands of color are shown in the indicator.

Figure 2:
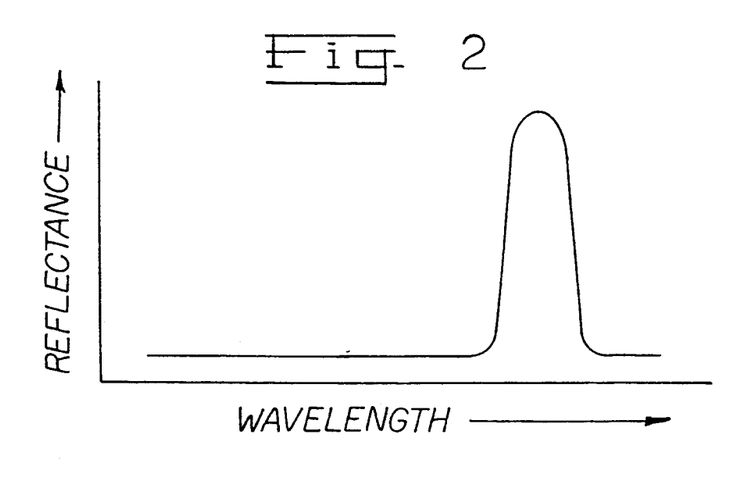
FIG. 2 is a representation of a hypothetical reflectance spectrum of an indicator of the present invention in an initial condition.
Figure 3:
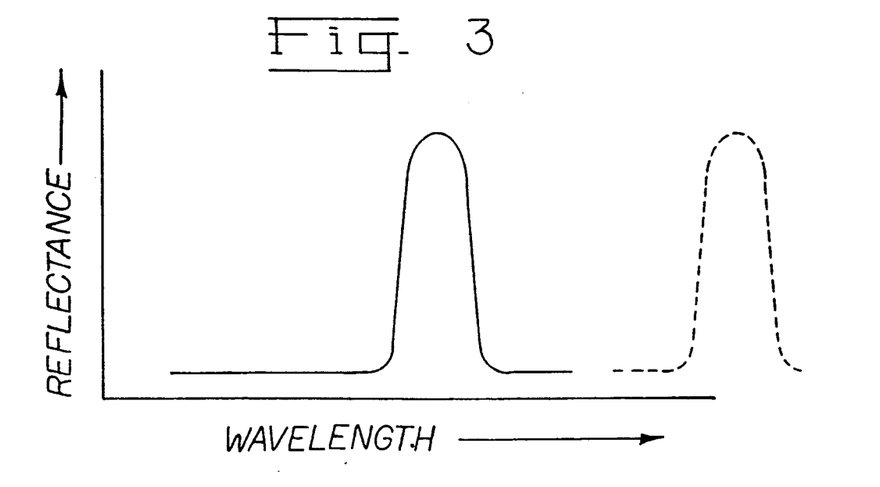
FIG. 3 is a representation of the hypothetical reflectance spectrum of FIG. 2 after the corresponding indicator of FIG. 2 has been strained beyond a selected extent.

The shift in the reflectance profiles of the strained and unstrained film samples which corresponds to the production of the visible evidence is illustrated in FIGS. 2 and 3 for a hypothetical film.

Preferably the materials A and B in the two component embodiment of our invention should differ in refractive index by about 0.03 or greater to produce a variety of colors, and the number of layers sufficiently great to make the reflectance of any colors unmistakable from the distances at which the indicator would likely be observed in use; where closely adjacent layers of the various diverse materials generally differ in refractive index by the same about 0.03 or greater, this should preferably correspond for the uses presently contemplated for the present invention to having at least about fifty total layers within the indicators. Typically, a hundred or more alternating layers of the A and B materials will be created in the two component embodiment of the present invention. The use of this number of layers, in addition to lending emphasis to the signal color change produced on achieving a degree of strain, is advantageous also in that it makes counterfeiting the indicators extremely difficult at the least.

In order for the color change to be effective evidence of strain generally or of an attempt at tampering in the more particular case of our tamper evident/tamper resistant films, the skin layers 16 at the least should not interfere with the perception of this change. Accordingly, at least one of the skin layers 16 adjacent a first surface 18 of the indicator 10 should be substantially transparent.

Where the background provided by the environment of the indicator 10 presents an adequate contrast to enable the color change to be reliably perceived by an observer thereof, both skin layers 16 may be substantially transparent. Where an adequate contrast is not thus presented, however, the second skin layer 16 may be pigmented as suggested earlier to provide the contrast necessary to have the signal color change recognized.

It should be mentioned that where processing equipment and techniques permit and an adequate percentage of layers can be said to have an initial optical thickness to allow the indicators to be substantially colorless absent an attempt at tampering, the skin layers 16 may be omitted altogether. Because of the very small physical thicknesses of the hundred or more layers which have thus far been used in developing the present tamper evident/tamper resistant packaging materials, however, it has been thought necessary to employ skin layers in actual practice which comprise from about 5 to about 10 percent by volume of the indicators of the present invention at least, although as noted earlier it may be desirable for structural rather than optical purposes to have thicker skin layers also.

The signal color change which is taken to constitute visible evidence of strain in our multilayer film indicator is produced at a level of strain wherein the yield point of at least one of the diverse materials which comprise the multilayer film indicator or of the skin layers 16 if present is at least equalled. In this way, whether the indicator consists of essentially two materials A and B or of a number of diverse thermo-plastic materials arranged in at least one period of P layers within the indicator, the relevant optical thicknesses remain after an attempt at tampering at levels which preserve the primary reflectance of the strained film in the visible range, and which thus preserve the color shift.

Ordinarily it will also be desirable, and for tamper evident/tamper resistant packaging materials in particular, if the materials which comprise the multilayer indicators of the present invention are selected so that the evidence of strain is still visible when the film indicators rupture and break, rather than having the optical thicknesses of the various layers decline with additional tampering to an extent whereby the primary reflectance wavelength passes into the ultraviolet range. In this manner, the purchaser of an item which is wrapped or packaged in the tamper evident/tamper resistant packaging material can know an item has been tampered with if the material is still intact and evidences a signal color change, or if the material has been removed altogether.

The two component embodiment which has thus far been primarily particularly described is generally considered satisfactory for purposes of the present invention, but even where the second order reflection has been suppressed, third, fourth and higher order reflections may exist which would give the appearance of color to some observers. Accordingly, a three component system has been developed which enables the suppression of not only the second order reflection but in a particularly preferred embodiment also the third and fourth order reflections.

In this three component system, the multilayer film indicator consists essentially of at least one series ABCB of layers of three diverse thermoplastic materials A, B and C wherein A possesses a higher refractive index $n_A$, B an intermediate refractive index $n_B$, and C a lesser refractive index $n_C$. The optical thicknesses and refractive indices of the various layers are preferably selected so that:

$$f_A = \frac{n_A d_A}{(n_A d_A + n_B d_B + n_C d_C + n_B d_B)} \approx 1/3;$$

$$f_B = \frac{n_B d_B}{(n_A d_A + n_B d_B + n_C d_C + n_B d_B)} \approx 1/6;$$

$$f_C = \frac{n_C d_C}{(n_A d_A + n_B d_B + n_C d_C + n_B d_B)} \cong 1/3; \text{ and}$$

$$n_B \cong \sqrt{n_A n_C}.$$

To start out again with a primary initial reflectance at a wavelength of about 700 nanometers, preferably at least a substantial majority of the layers A, B and C should have an optical thickness substantially of about 0.09 micrometers or greater throughout the thickness of the indicator when the indicator is in the initial condition. The optical thicknesses of the layers may be adjusted, as before, where considerations of handling strains and the like require.

And, again as before, preferably the materials A, B and C will be selected so that the highest and lowest refractive indices of layers within a period of P layers will differ by about 0.03 or greater (so that $n_A - n_C \geq 0.03$), with a sufficient number of layers to make the signal color change produced on achieving a selected extent of strain readily detectable. Most preferably, the refractive indices within a period of P contiguous layers will differ from one layer to the next by about 0.03 or greater. Preferably, the indicators of the present invention in this regard will comprise at least about fifty layers, and most preferably, at least about one hundred layers.

The two and three component embodiments which have been described in detail above are preferred because the two and three component embodiments of specified f-ratios provide a multilayer optical interference film indicator which has the least amount of higher order reflectance in the visible wavelengths that is presently deemed achievable. This results generally in greater control over the reflectance of the films, and permits the initial reflectance to be designed for a higher wavelength without higher order reflections bringing color to the films.

The greater separation between the wavelength corresponding to the primary reflectance in an initial condition and the upper end of the visible range provides a processing window for making the multilayer film indicators of the present invention which is generally desirable. Also, one may not know precisely how much "innocent" or accidental strain might be encountered by the indicators of the present invention in a given application, so that a safety factor could be built into the devices, if desired, to prevent excessive false-positive readings without an excessive loss in detection capabilities.

This is not to suggest, however, that other f-ratios and arrangements, employing any number of thermoplastic materials with different refractive indices, might not also exist which would function adequately in making the indicators of the present invention initially substantially colorless, particularly in a given environment or use. Precisely what each of these other arrangements might be is not presently known, but the reader is referred to U.S. Pat. No. 3,247,392 to Thelen for an example of a possible arrangement.

Again with regard to achieving and preserving evidence of strain, the multilayer film indicators may in summary be constructed in a number of ways. One possible configuration would place at least one material whose yield point is at least equalled when the evidence is produced within the core layers of a multilayer film indicator having skin layers.

Another configuration would encapsulate core layers comprised of elastomeric materials within skin layers whose yield point would be at least equalled when the color change occurs, thus preventing the elastomeric inner or core layers from returning to an unstretched or unstrained condition. This configuration is exemplified below in Example 1.

As noted earlier, the film indicators of the present invention may not employ skin layers at all. Or, if skin layers are employed, one or both may be substantially transparent. However constructed, the multilayer film indicators of the present invention are well adapted for a number of uses, and are particularly well suited for a tamper evident, tamper resistant packaging material.

When used in or as a tamper evident, tamper resistant packaging material, the multilayer film indicators of the present invention may preferably be heat-shrinkable and used as a shrink band joined to two portions of an item which are movable with respect to one another, such as the neck and screw cap of a prescription bottle. Alternatively, the films may be used in the form of a membrane seal across an opening in a container. Or, the films may be used to overwrap an item entirely. It may also be desirable to employ the films of the present invention in two or all three of these capacities to improve the tamper evidence or tamper resistance properties of an item packaged therein.

The multilayer film indicators of the present invention may be further illustrated by the examples which follow. These examples are offered only for purposes of illustration and are not intended to suggest any limitations with regard to the present invention as defined by the appended claims.

EXAMPLE 1

In this example a multilayer film indicator including 197 alternating layers of Pebax ® 2533 SA00 polyether amide (Atochem Company, Paris, France) with a refractive index of 1.49, and of Pellethane ® 2355-95 AEF polyurethane produced by The Dow Chemical Company, Midland, Mich., and having a refractive index of 1.56, was made by multilayer coextrusion according to the processes and using equipment and techniques such as described in commonly-assigned U.S. Pat. Nos. 3,759,647, 3,773,882, and 3,884,606. These 197 layers were encapsulated within skin layers of substantially transparent and unpigmented Profax ® 6131 polypropylene (Hercules, Inc.) by coextrusion therewith, with each of the cap or skin layers comprising approximately 10 percent of the total 0.002 inch thickness of the film. A one inch wide strip of this multilayer film was wrapped around the neck and screw cap of a bottle, and a hot air gun was used to cause the film to shrink to fit tightly around the neck and cap. Unscrewing of the cap caused the film to reflect vivid colors of red, green, yellow and blue. Further twisting of the cap caused the film to rupture. The cap could be rotated less than approximately 15° until the color change appeared and approximately 45° before the film ruptured.

EXAMPLE 2

This example simulated the reflectance spectrum of a multilayer film indicator consisting essentially of layers of three diverse thermoplastic materials A, B and C in an ABCBA layer order as an ABCB repeating unit, with layers of the A material being immediately adjacent opposing outer surfaces of the indicator. The A, B and C materials selected for the simulation were a polystyrene of a refractive index of 1.59, a styrenemethylmethacrylate copolymer with a refractive index of 1.539, and a polymethylmethacrylate of a refractive index of 1.49. These materials were chosen to satisfy the relationship $n_B = \sqrt{n_A n_C}$. The optical thicknesses of materials within a series of such layers were chosen so that:

$$f_A = \frac{n_A d_A}{(n_A d_A + n_B d_B + n_C d_C + n_B d_B)} \approx 1/3;$$

$$f_B = \frac{n_B d_B}{(n_A d_A + n_B d_B + n_C d_C + n_B d_B)} \approx 1/6;$$

$$f_C = \frac{n_C d_C}{(n_A d_A + n_B d_B + n_C d_C + n_B d_B)} \approx 1/3; \text{ and}$$

$$\lambda_0 = 2(n_A d_A + n_B d_B + n_C d_C + n_B d_B) = 1.35 \ \mu m.$$

Using the materials and relationships set forth above a reflectance spectrum was simulated for this three component multilayer film indicator having ABCB repeating units, according to a program developed using a MATHCAD 2.0 software package from Mathsoft, Inc., Cambridge, Mass., and run on an IBM AT personal computer with a 640K base memory and a 1 MB expanded memory.

The computer programmer relied on the matrix method discussed extensively in A. Vasicek, "Optics of Thin Films", North Holland Publishing Co., Amsterdam (1960), and used the equations developed therein and in H. A. MacLeod, "Thin-Film Optical Filters", Adam Hilger, London (1969), and in M. Born and E. Wolf, "Principles of Optics", Pergamon Press (1965). The refractive indices of the A, B and C materials were supplied to the model, as was the number of repeating ABCB series or periods of the film to be modeled. The angle of incidence of incoming light, the various optical thickness ratios $f_A$, $f_B$ and $f_C$, the wavelength corresponding to a desired primary reflectance, and the wavelength range for simulation were also supplied.

Figure 4:
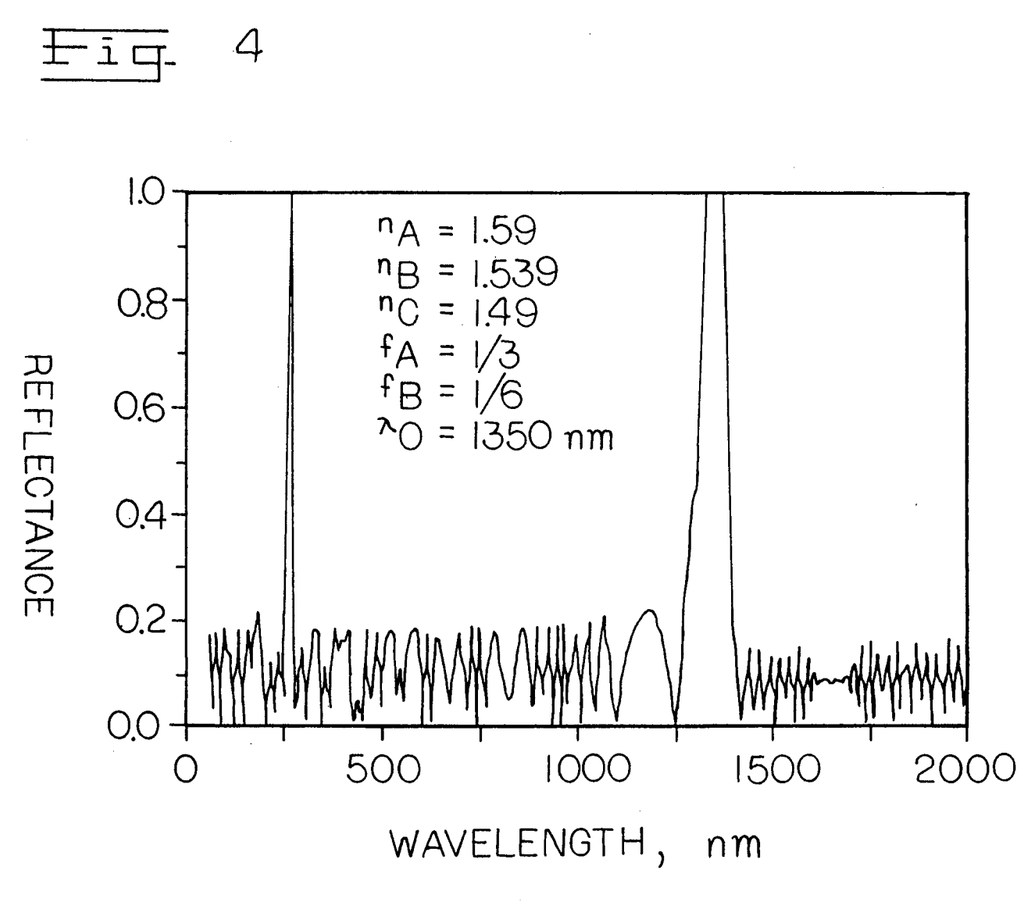
FIGS. 4 and 5 are simulated, computer generated reflectance spectra for various embodiments of the present invention.
Figure 5:
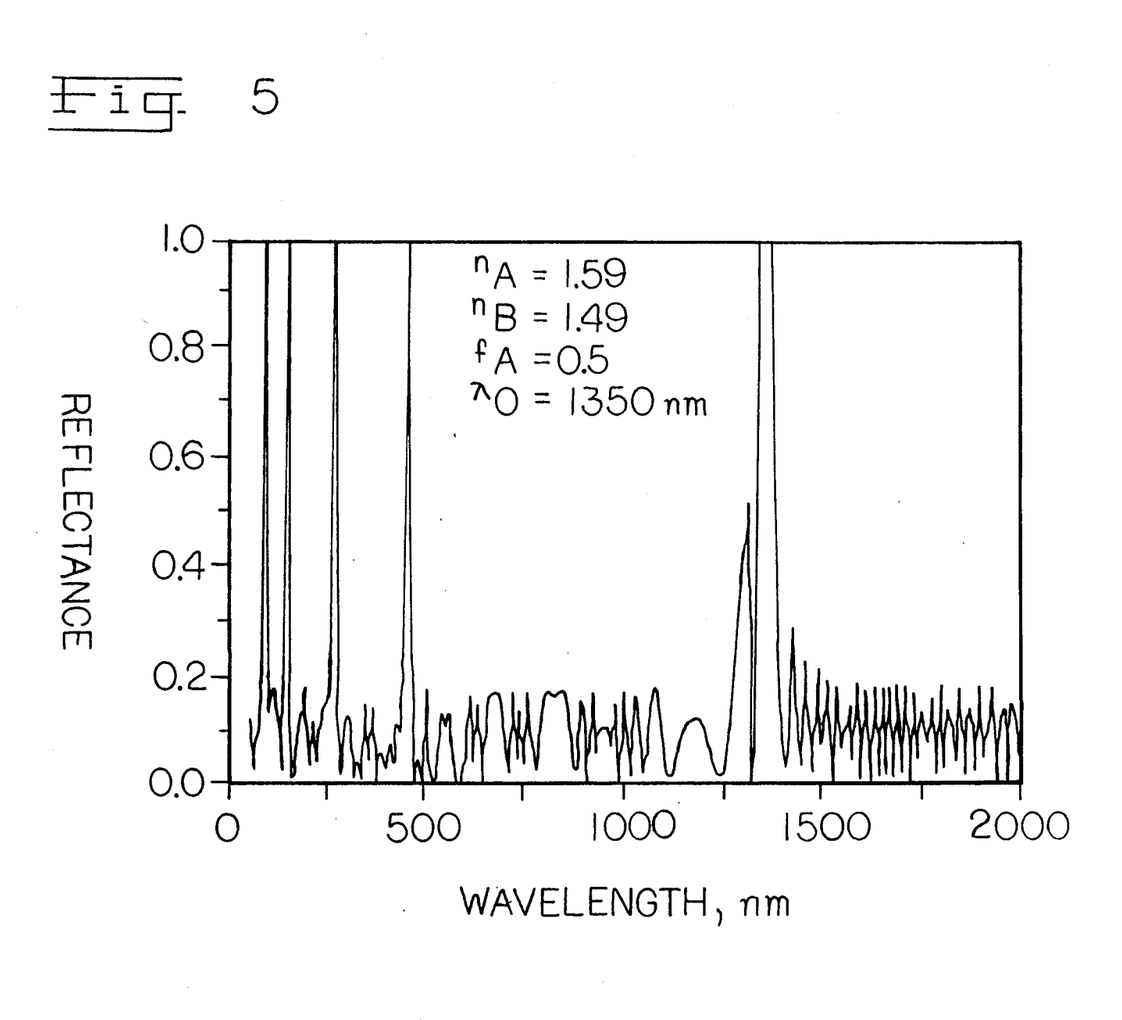

FIG. 4 shows the above-mentioned simulated reflectance spectrum constructed by this method with the polystyrene, styrene-methylmethacrylate and polymethylmethacrylate system, and confirms that a selection of the f-ratios and refractive indices for a three component indicator which are set forth above will suppress the second, third and fourth orders of reflection and result in an indicator which in an initial condition is substantially colorless.

The same model also simulated the reflectance spectra of two component film indicators constructed as in Example 1 to confirm the general accuracy of the model's simulated spectra by comparison to those seen in actual practice. The simulated spectra corresponded well with those seen in actual practice and show a suppression of the second order reflection where $f_A$ is approximately equal to 0.5, see FIG. 5.

Examples 1 and 2 demonstrate that the two and three component multilayer film indicators which have been described herein as preferred are suitable for accomplishing the purposes and realizing the advantages of the present invention.

What is claimed is:

1. A multilayer optical interference film comprised of contiguous layers of two or more diverse thermoplastic materials of differing refractive indices whereby the film retains a permanent visual color change as evidence of tampering or an attempt at tampering when the yield point of at least one of the diverse materials has been at least equalled by the strain associated with such tampering or with such an attempt at tampering, and where before such yield point is at least equalled the wavelength of an unsuppressed reflectance of normally incident light is not within the visible spectrum while after such yield point is at least equalled the reflectance is retained in the visible spectrum to provide a permanent visual color change.

2. A film as defined in claim 1, wherein the film will rupture with a degree of additional strain before the permanent color change is lost.

3. A film as defined in claim 1, wherein the refractive index corresponding to a layer of each of the two or more materials differs from the refractive indices of immediately adjacent layers by about 0.03 or greater.

4. A film as defined in claim 1, consisting essentially of at least one period of layers of two diverse thermoplastic materials A and B in an ABAB-type layer order, and having average layer thicknesses $d_A$ and $d_B$, respectively, wherein A possesses a refractive index $n_A$ and B a refractive index $n_B$, and further wherein the ratio $$f_A = \frac{n_A d_A}{n_A d_A + n_B d_B}$$

is equal to about 0.5.

5. A film as defined in claim 4, wherein a substantial majority of said layers of said two diverse thermoplastic materials A and B have an optical thickness substantially of about 0.17 $\mu$m or greater before being strained by tampering or an attempt at tampering.

6. A film as defined in claim 1, further including outer skin layers which are substantially transparent to visible light.

7. A film as defined in claim 1, consisting essentially of at least one series of layers of three diverse thermoplastic materials A, B and C in an ABCB-type layer order, and having average layer thicknesses $d_A$, $d_B$ and $d_C$, respectively, wherein A possesses a higher refractive index $n_A$, B an intermediate refractive index $n_B$, and C a lesser refractive index $n_C$, and wherein:
the ratio $$f_A = \frac{n_A d_A}{(n_A d_A + n_B d_B + n_C d_C + n_B d_B)}$$

has a value of about ⅓;
the ratio $$f_B = \frac{n_B d_B}{(n_A d_A + n_B d_B + n_C d_C + n_B d_B)}$$

has a value of about 1/6;
the ratio $$f_C = \frac{n_C d_C}{(n_A d_A + n_B d_B + n_C d_C + n_B d_B)}$$

has a value of about ⅓, and $$n_B \approx \sqrt{n_A n_C}.$$

8. A film as defined in claim 7, wherein a substantial majority of the layers of A, B and C have an optical thickness substantially of about 0.09 $\mu$m or greater before being strained by tampering or an attempt at tampering.

9. A film as defined in claim 7, wherein A, B and C respectively are a polystyrene of refractive index $n_A$ of about 1.59, a styrene-methylmethacrylate copolymer of refractive index $n_B$ of about 1.54, and a polymethylmethacrylate with a refractive index $n_C$ of about 1.49.

10. A film as defined in claim 1, wherein the cross-sectional area of the film is reduced at one or more locations.

11. A film as defined in claim 10, wherein the film has been perforated at one or more locations.

12. A film as defined in claim 1, wherein the highest and lowest refractive indices corresponding to said contiguous layers of said two or more diverse thermoplastic materials differ by about 0.03 or greater.

13. A tamper evident, tamper resistant packaging material which includes a film as defined in claim 1.

14. A packaging material as defined in claim 13 which is heat-shrinkable.

15. An item which has been at least partially packaged within a film as defined in claim 1, and wherein the film has been joined to two portions of the item which are movable with respect to one another.

16. An item which comprises a membrane seal, wherein the membrane seal consists essentially of a multilayer film as defined in claim 1.

17. A method of protecting the contents of a container from adulteration and for otherwise ensuring the integrity and authenticity of such contents, including the step of wrapping the container in its entirety or in significant part with the tamper evident, tamper resistant packaging material of claim 13.

* * * * *